(12) United States Patent
Walter

(10) Patent No.: US 12,430,723 B2
(45) Date of Patent: Sep. 30, 2025

(54) DATA PROCESSING APPARATUS AND METHOD FOR PROCESSING A DIGITAL IMAGE HAVING PHOTON ARRIVAL-TIME DATA

(71) Applicant: LEICA MICROSYSTEMS CMS GMBH, Wetzlar (DE)

(72) Inventor: Kai Walter, Wetzlar (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 217 days.

(21) Appl. No.: 18/271,045

(22) PCT Filed: Jan. 14, 2022

(86) PCT No.: PCT/EP2022/050766
§ 371 (c)(1),
(2) Date: Jul. 6, 2023

(87) PCT Pub. No.: WO2022/167198
PCT Pub. Date: Aug. 11, 2022

(65) Prior Publication Data
US 2024/0303785 A1    Sep. 12, 2024

(30) Foreign Application Priority Data
Feb. 5, 2021    (EP) .................................... 21155585

(51) Int. Cl.
*G06K 9/00* (2022.01)
*G06T 5/73* (2024.01)
(52) U.S. Cl.
CPC ...... *G06T 5/73* (2024.01); *G06T 2207/10064* (2013.01); *G06T 2207/20081* (2013.01)

(58) Field of Classification Search
CPC ............. G06T 5/73; G06T 2207/10064; G06T 2207/20081; G06T 5/60; G06T 2207/10056; G06T 2207/20084
See application file for complete search history.

(56) References Cited

U.S. PATENT DOCUMENTS

2021/0209759 A1* 7/2021 Smith ................... G06N 3/045

FOREIGN PATENT DOCUMENTS

CN     108700460 A  * 10/2018  ......... G01N 21/6458

OTHER PUBLICATIONS

Ching-Wei Chang, Applying Image Restoration to Fluorescence Lifetime Imaging Microscopy (FLIM), and Mary-Ann Mycek. (Year: 2009, Optical Society of America, SPIE-OSA/ vol. 7367 73671E1-6.*

(Continued)

*Primary Examiner* — Xin Jia
(74) *Attorney, Agent, or Firm* — LEYDIG, VOIT & MAYER, LTD.

(57) ABSTRACT

A data processing apparatus for processing a digital input image is configured to receive the digital input image. The digital input image includes input photon arrival-time data at input image locations. The data processing apparatus is further configured to compute a digital output image based on the digital input image by deconvolution. The digital output image includes output photon arrival-time data at output image locations. The output photon arrival-time data represent an estimate of an unblurred ground-truth of the input photon arrival-time data. The data processing apparatus is further configured to compute the deconvolution by an iterative algorithm using an update function. The update function depends on a point-spread function, a previous estimate of the ground-truth, and the input photon arrival-time data.

14 Claims, 6 Drawing Sheets

(56) References Cited

OTHER PUBLICATIONS

Chang Ching-Wei and Mary-Ann Mycek: "Applying image restoration to fluorescence lifetime imaging microscopy (FLIM)," Proceedings of SPIE 7367, Jul. 1, 2009 ,pp. 73671E-1-73671E-6, US.
Markham, Joanne and José-Angel Conchello: "Fast maximum-likelihood image-restoration algorithms for three-dimensional fluorescence microscopy," J. Opt. Soc. Am. A, vol. 18 No. 5, May 2001, pp. 1062-1071, US.
Chorvat Jr., D and A.Chorvatova: "Sprectrally resolved time-correlated single photon counting: a novel approach for characterization of endogenous fluorescence in isolated cardiac myocytes," European Biophysics Journal; With Biophysics Letters, Springer, Berlin, DE, vol. 36, No. 1, Oct. 11, 2006 (Oct. 11, 2006), pp. 73-83, XP019458677.
Wikipedia: "Fluorescence-lifetime imaging microscopy" https://en.wikipedia.org/w/index.php?title=Fluorescence-lifetime_imaging_microscopy&oldid=1000247747 [retrieved on Mar. 3, 2021], US, Jan. 14, 2021, XP055781798, pp. 1-8.
Community Partners: "Can Deep Learning learn existing deconvolution (or other) algorithms?," https://forum.image.sc/t/can-deep-learning-learn-existing-deconvolution-or-other-algorithms/28905/19 [retrieved on Mar. 4, 2021], Aug. 2019, XP055781916, pp. 1-10, image.sc, US.

\* cited by examiner

DATA PROCESSING APPARATUS AND METHOD FOR PROCESSING A DIGITAL IMAGE HAVING PHOTON ARRIVAL-TIME DATA

CROSS REFERENCE TO RELATED APPLICATIONS

This application is a U.S. National Phase application under 35 U.S.C. § 371 of International Application No. PCT/EP2022/050766, filed on Jan. 14, 2022, and claims benefit to European Patent Application No. EP 21155585.9, filed on Feb. 5, 2021. The International Application was published in English on Aug. 11, 2022 as WO 2022/167198 A1 under PCT Article 21(2).

FIELD

Embodiments of the present invention relate to a data processing apparatus and method for processing a digital input image. Embodiments of the present invention further relate to a fluorescence lifetime imaging device comprising such a data processing apparatus.

BACKGROUND

The processing of photon arrival-time data is for example known from fluorescence lifetime imaging microscopy (FLIM). In FLIM, an arrival time histogram of detected photons is stored at each image location, i.e. at each pixel or voxel.

A major goal of FLIM is to estimate the lifetime or, in other words, decay time of fluorescence from the arrival time of photons. The fluorescence is emitted by a fluorophore which has been illuminated by light comprising a fluorescence-triggering wavelength band. The lifetime indicates in particular a chemical state of the fluorophore and thus allows to draw conclusions about the chemical environment of the fluorophore.

The photon arrival-time data are usually very noisy. Further, the detection system unavoidably creates a spatial blur in the recorded images. Thus, images that are computed from photon arrival-time data tend to be blurry.

In contrast to classic image data, which comprise one or more time-independent intensity values at each image location, normal deconvolution algorithms, such as Wiener deconvolution, cannot be applied for sharpening an image containing a time series of intensity values (if an intensity value is deemed to be represented by a photon count).

It is known, however, e.g. from O'Connor, D., V., Ware, W., R., and Andre, J., C.: "*Deconvolution of Fluorescence Decay Curves. A Critical Comparison of Techniques*", Journal of Physical Chemistry, 83(10), 1333-1343, 1979, to apply deconvolution on the arrival-time data. This deconvolution, however, only deblurs arrival-time data. Spatial resolution is not improved.

It is also known to apply multi-image deconvolution to digital input images that comprise arrival-time data. This is, for example, described in Castello, M., Diaspro, A., and Vicidomini, G.: "*Multi-images Deconvolution Improves Signal-to-Noise Ratio on Gated Stimulation Emission Depletion Microscopy*", Applied Physics Letters, 105(23): 234106, 2014. However, this approach is not satisfactory insofar, as it results in a digital output image, where information about photon arrival time is lost. Thus, a FLIM-like analysis is no longer possible. In addition, multi-image deconvolution has further drawbacks. For example, it is severely affected by noise. Multi-image deconvolution is also computationally inefficient as a deconvolution needs to be carried out for all time steps separately. Finally, multi-image deconvolution does not provide a solution if there is more than one fluorophore and thus more than one fluorescence emission spectrum present in the input image data.

Thus, there is a need to provide an apparatus and a method that is capable of deblurring a digital image containing photon arrival-time data, that is computationally efficient and that retains the arrival-time information in the result.

SUMMARY

Embodiments of the present invention provide a data processing apparatus for processing a digital input image. The data processing apparatus is configured to receive the digital input image. The digital input image includes input photon arrival-time data at input image locations. The data processing apparatus is further configured to compute a digital output image based on the digital input image by deconvolution. The digital output image includes output photon arrival-time data at output image locations. The output photon arrival-time data represent an estimate of an unblurred ground-truth of the input photon arrival-time data. The data processing apparatus is further configured to compute the deconvolution by an iterative algorithm using an update function. The update function depends on a point-spread function, a previous estimate of the ground-truth, and the input photon arrival-time data.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
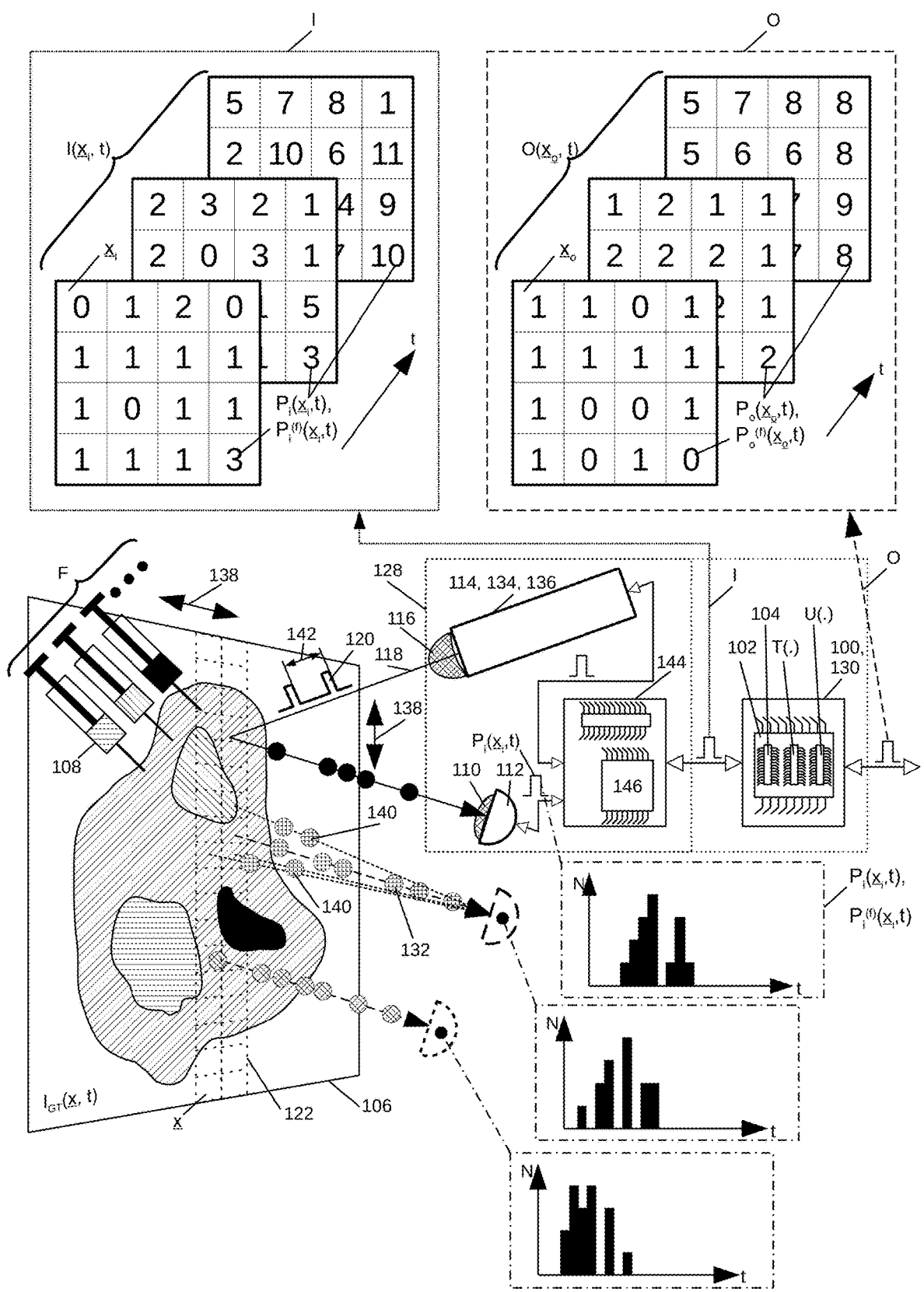
FIG. 1 shows a schematic representation of a fluorescence-lifetime imaging device and a data processing apparatus according to some embodiments.

Embodiments of the present invention provide a data processing apparatus for processing a digital input image, which is configured to compute a digital output image based on the digital input image by deconvolution, the digital output image comprising output photon arrival-time data at output image locations, the output photon arrival-time data representing an estimate of an unblurred ground truth of the input photon arrival-time data, and to compute the deconvolution by an iterative algorithm using an update function, the update function depending on a point-spread function, a previous estimate of the ground truth and the input photon arrival-time data.

Embodiments of the present invention also provide a computer-implemented method for processing a digital input image, the digital input image comprising input photon arrival-time data at input image locations, wherein a digital output image is computed from the digital input image by deconvolution, the digital output image comprising output photon arrival-time data at output image locations, the output photon arrival-time data representing an estimate of an unblurred ground truth of the input photon arrival-time data, wherein the deconvolution is computed by an iterative algorithm using an update function, the update function depending on a point-spread function, a previous estimate of the ground truth and the input photon arrival-time data.

Embodiments of the present invention also provide a fluorescence life-time imaging device comprising such a data processing apparatus, by a computer-program product and/or a computer-readable medium, comprising instructions which, when executed by a computer, cause the computer to carry out the data processing method.

Embodiments of the present invention also provide a machine learning product or device for processing a digital input image, the digital input image comprising input image data at input image locations, the input image data comprising input photon arrival-time data, the machine learning product being configured to compute a digital output image, the digital output image comprising output image data at output image locations, the digital output image data comprising output photon arrival-time data at output image locations, the machine learning product having been trained by pairs of different digital input images and digital output images, each digital output image of a pair computed from a digital input image of the pair using the above digital output signal processing method.

Embodiments of the present invention also provide a method for training a machine-learning product using the above data processing method.

Embodiments of the present invention can result in a digital output image which contains photon arrival-time data. Thus, the above solutions are fully compatible with a FLIM-related analysis. The iterative algorithm and the update function allow to use computationally efficient algorithms. Finally, the spatial resolution and the signal-to-noise ratio of the photon arrival-time data are improved, as the estimate of the ground truth, i.e. the "real" picture without any noise and contortion, considers both the photon arrival-time data and spatial location.

Embodiments of the present invention may further be improved by the following features that may be combined with one another independently. In this context, features that are described in the following with a reference to an apparatus or device may also be used for improving a method, and features that are described in the following with a reference to a method may also be used for improving an apparatus or device.

For example, the digital input image may be a line image, i.e. a one-dimensional image, a two-dimensional image, three-dimensional image or a higher dimensional image.

The digital output image preferably has the same dimensionality as the digital input image, so that no information is lost. In particular, the digital input and output images may comprise the same number of image locations. Preferably, the image locations of the digital input and output images correspond to each other. Any of these features ensures that the information contained in the digital output image may be correlated to one another. An input and/or output image location may be one of a pixel and a voxel, depending on whether the digital input and/or output image represents surface or volume data.

At least one, preferably at least two of the input and/or output image dimensions may be spatial dimensions.

Generally, the input photon arrival-time data may contain arrival-time data of photons of one or more fluorophores.

In a further embodiment, the input photon arrival-time data may be dye-separated. For example, at each image location, there may be two or more sets of photon arrival-time data, each set representing a different fluorophore, i.e. photons in a different fluorescence band. It is to be noted that these sets may be combined into a single digital input and/or output image, and represent an additional dimension of the respective digital input and/or output image. For example, a digital output image comprising three spatial dimensions X, Y, Z and, at each image location, two sets of photon arrival-time data may be considered as a five-dimensional digital output image.

Moreover, it is preferred, but not necessary, that each input image location contains photon arrival-time data, even if these data are an empty set or NULL.

In another embodiment, the digital input image is or was recorded by an optical device, in particular by a (confocal) laser scanning microscope.

The digital input image may be or may have been recorded by a photon-counting device, such as a time-correlated photon-counting device and/or an assembly comprising a gated optical intensifier and a CCD sensor or camera. More generally, any device for generating a digital input image that comprises input image data, which in turn comprise input photon arrival-time data at input image locations, may be used.

The optical device and/or the photon-counting device may be characterized by a point-spread function. The point-spread function may be time-invariant or time-dependent. The same might be true for the update function.

According to another embodiment, the input photon arrival-time data at an input image location may differ from the output photon arrival-time data at an output image location that corresponds to the input image location. In particular, the output photon arrival-time data at a specific time and output image location may result from a superposition of the input photon arrival-time data at this specific time from at least one different input image location. In particular, the input photon arrival-time data at a specific arrival time may be shifted to different locations in the output image data by the iterative algorithm. This may be the case because the update function assigns these arrival-time data to another image location, to minimize some error constraint or cost function. In other words, the iterative algorithm or the update function may shift "stray" photons, which have been captured at one input image location, to an output image location that is deemed more appropriate.

Thus, the update function may represent a redistribution of the photon arrival-time data, depending on the point-spread function.

In general, the deconvolution, in particular the iterative algorithm may assume one of the following mathematical forms:

$$E^{(m)}(\underline{x}_i, t) = E^{(m-1)}(\underline{x}_i, t) \cdot U(E^{(m-1)}(\underline{x}_i, t), psf(\underline{x}_i[, t]), P_i(\underline{x}_i, t)) \text{ or}$$

$$E^{(m)}(\underline{x}_i, t) = E^{(m-1)}(\underline{x}_i, t) + U(E^{(m-1)}(\underline{x}_i, t), psf(\underline{x}_i[, t]), P_i(\underline{x}_i, t)).$$

Herein, $\underline{x}_i$ represents an input image location, typically a set of coordinates and/or an array index; t represents time; $psf(\underline{x}_i[, t])$, represents the point-spread function which may be time-dependent as symbolized by the brackets; $P_i$ represents the input photon arrival-time data; $E^{(m-1)}$ represents the estimate of the ground truth at iteration step m−1; and U is the update function.

Thus, the iterative algorithm may comprise a combination of the update function, with a previous estimate of the unblurred ground truth of the input photon arrival-time data, wherein the combination is at least one of additive and multiplicative.

However, it is preferred that at least one of the point-spread function, the ground truth estimate and the update function is time-independent. For this, these functions do not need to be time-invariant themselves. For example, the deconvolution may contain an operation on at least one of the input image data, the point-spread function and the previous estimate of the unblurred ground truth, wherein the operation is configured to eliminate time-dependency of its operand.

Thus, a time-dependent point-spread function as an operand of the operation T may be rendered time-independent by this operation as follows:

$$psf(\underline{x}_i) = T(psf(\underline{x}_i, t)).$$

Of course, the operation T does not need to be applied if a time-invariant point-spread function is used.

A time-independent ground truth estimate can be obtained by the operation T by being used as an operand as follows $$E^{(m-1)}(\underline{x}_i) = T(E^{(m-1)}(\underline{x}_i, t)).$$

The input photon arrival-time data as an operand of the operation T may be rendered time-independent by also applying the operation T:

$$P_i(\underline{x}_i) = T(P_i(\underline{x}_i, t)).$$

For each of the above examples, a different operation T may be used. For example, the operation T may involve a statistical moment, a sum over time and/or the value of the operand of the operation T at a specific point in time, $t_1$. Examples of operations T and their application are given below. Any of these examples may be used in any combination.

$$T(E^{(m-1)}(\underline{x}_i, t)) = \sum_t E^{(m-1)}(\underline{x}_i, t)$$

$$T(psf(\underline{x}_i, t)) = \sum_t psf(\underline{x}_i, t)$$

$$T(P_i(\underline{x}_i, t)) = \sum_t P_i(\underline{x}_i, t)$$

$$T(psf(\underline{x}_i, t)) = psf(\underline{x}_i, t_1)$$

$$T(E^{(m-1)}(\underline{x}_i, t)) = E^{(m-1)}(\underline{x}_i, t_1)$$

$$T(P_i(\underline{x}_i, t)) = P_i(\underline{x}_i, t_1)$$

If the operation T represents a statistical moment, it may be represented as $$T(F(\underline{x}_i, t)) = \sum_t F^k(\underline{x}_i, t), k \in \mathbb{N},$$

where k represents an exponent and the operand $F(\underline{x}_i, t)$ may be the point-spread function $psf(\underline{x}_i, t)$, the ground truth estimate $E^{(m-1)}(\overline{x}_i, t)$ or the input photon arrival-time data, $P_i(\overline{x}_i, t_1)$.

If the operation T involves taking a sum of the input photon arrival-time data and/or the ground truth estimate, the signal-to-noise ratio is greatly reduced.

The operation T, and/or the use of a time-invariant point-spread function allows to obtain a time-independent update function as follows:

$$E^{(m)}(\underline{x}_i, t) = E^{(m-1)}(\underline{x}_i, t) + U(T(E^{(m-1)}(\underline{x}_i, t)), psf(\underline{x}_i), T(P_i(\underline{x}_i, t)))$$

or $$E^{(m)}(\underline{x}_i, t) = E^{(m-1)}(\underline{x}_i, t) \cdot U(T(E^{(m-1)}(\underline{x}_i, t)), psf(\underline{x}_i), T(P_i(\underline{x}_i, t)))$$

or $$E^{(m)}(\underline{x}_i, t) = E^{(m-1)}(\underline{x}_i, t) + U(T(E^{(m-1)}(\underline{x}_i, t)), T(psf(\underline{x}_i, t)), T(P_i(\underline{x}_i, t)))$$

or $$E^{(m)}(\underline{x}_i, t) = E^{(m-1)}(\underline{x}_i, t) \cdot U(T(E^{(m-1)}(\underline{x}_i, t)), T(psf(\underline{x}_i, t)), T(P_i(\underline{x}_i, t))).$$

The above equations can be interpreted physically in that a photon count at a specific time is retained at that particular time over all iterations. However, the location of that specific photon count may be altered depending on the update function. Thus, the above update function "redistributes" the photon counts over space.

This form of the iterative algorithm has the advantage that the ground truth estimate $E^{(m)}$ is time-dependent, i.e. still contains arrival-time data at each image location, although the update function U is time-independent. This makes a FLIM-related analysis possible on the result.

As another advantage, using a time-invariant update allows to use known and efficient deconvolution algorithms and thus does not require special solution. For example, the update function can be computed using a Richardson-Lucy deconvolution. In this case, the update function may have the following form:

$$U(\underline{x}_i) = psf(-\underline{x}_i) *_{\underline{x}_i} \frac{P_i(\underline{x}_i)}{psf(\underline{x}_i) *_{\underline{x}_i} E^{(m-1)}(\underline{x}_i)},$$

where $*_{\underline{x}_i}$ denotes spatial convolution.

The iterative algorithm is terminated e.g. after the $M^{th}$ iteration, m=1, . . . , M, if a convergence criterion is met. A possible convergence criterion is:

$$\|E^{(m-1)}(\underline{x}_i, t) - E^{(m)}(\underline{x}_i, t)\|_2^2 < \kappa$$

or $$\frac{\|E^{(m-1)}(\underline{x}_i, t) - E^{(m)}(\underline{x}_i, t)\|_2^2}{\|E^{(m-1)}(\underline{x}_i, t) + E^{(m)}(\underline{x}_i, t)\|_2^2} < \kappa,$$

where κ is the convergence criterion, e.g. some real number, such as 0.2.

If the convergence criterion is met, the ground truth estimate at the $M^{th}$ iteration is supposed to represent the output photon arrival-time data $P_o(\underline{x}_i, t)$ of the output image:

$$P_o(\underline{x}_o, t) = E^{(M)}(\underline{x}_i, t).$$

In principle, the above deconvolution can be used irrespective of the number of fluorophores represented in the input photon arrival-time data at one input image location.

If, however, the photon arrival times of more than one fluorophore is contained in the input photon arrival-time data, it may be advisable to separate the different fluorescence photons before carrying out the deconvolution.

Thus, in one embodiment, the input photon arrival-time data $P_i(\underline{x}_i, t)$ may result from a combination of input photon arrival-time data $P_i^{(f)}(\underline{x}_i, t)$, f=1, . . . , F of a total number F of different fluorophores, the number F being larger than 1, for example as follows:

$$P_i(\underline{x}_i, t) = \sum_{f=1}^{F} P_i^{(f)}(\underline{x}_i, t).$$

In such a case, the input photon arrival-time data $P_i(\underline{x}_i, t)$ may be regarded as the sum of the different input photon arrival-time data $P_i^{(f)}(\underline{x}_i, t)$ of each of the F fluorophores. The input photon arrival-time data that result from the $f^{th}$ fluorophore, $P_i^{(f)}(\underline{x}_i, t)$, are termed dye-separated input photon arrival-time data in the following.

It is preferred that the combined input photon arrival-time data are separated into dye-separated input photon arrival-time data, wherein the number of dye-separated input photon arrival-time data in the set corresponds to the number of different fluorophores. Each of the different dye-separated input photon arrival-time data represents the development of the fluorescence over time of a different fluorophore. Although it is, in principle, also possible to compute the dye-separated photon arrival-time data after the deconvolution, better results are obtained if the deconvolution is carried out for each of the dye-separated input photon arrival-time data separately as this allows to apply different point-spread functions for the different fluorophores.

As a result of the dye-separation of the input photon arrival-time data, an input image $I(\underline{x}_i, t)$, is split into F dye-separated input images $I^{(f)}(\underline{x}_i, t)$, f=1, . . . , F, where the $f^{th}$ dye-separated input image comprises, at the input image locations, the dye-separated input photon arrival-time data $P_i^{(f)}(\underline{x}_i, t)$ of the $f^{th}$ fluorophore.

The separation of the input photon arrival-time data into a plurality of dye-separated input photon arrival-time data may, for example, be carried out depending on at least one predetermined dye decay curve, which is different for each of the different fluorophores.

For example, a dye decay curve for one specific fluorophore f may assume the following form:

$$D^{(f)}(t; \tau_f) = h(t) * e^{-\frac{t}{\tau_f}},$$

where h(t) is the instrument response for the detection of photons, $*_t$ is a convolution in time and $\tau_f$ is the fluorescence lifetime for this specific fluorophore. The instrument response is representative of the system response of the photon-counting device.

As a first step, the lifetimes $\tau_f$ of the different fluorophores may be estimated from the digital input image. In this step, the lifetimes may be estimated by using the input photon arrival-time data at a plurality of input image locations, in particular all input image locations of the digital input image.

For example, aggregate input photon arrival-time data may be computed from a combination of the input photon arrival-time data from a plurality of input image locations, e.g. by additively and/or multiplicatively combining those input photon arrival-time data.

An example for computing such aggregate input photon arrival-time data $P_\Sigma(t)$ is given as follows:

$$P_\Sigma(t) = \sum_{\underline{x}_i} P_i(\underline{x}_i, t).$$

From the aggregate input photon arrival-time data, a dye decay curve may be computed for each of the number of different fluorophores. Such a computation may, e.g. include fitting a preferably linear combination of the predetermined decay curves to the aggregate input photon arrival-time data. A fit may e.g. be computed for each fluorophore f using a minimization scheme, for example, in the following form:

$$\{a_f, \tau_f\} = \underset{\{\hat{a}_f, \hat{\tau}_f\}}{\arg\min} \left\| P_\Sigma(t) - \sum_{f=1}^{F} \hat{a}_f D^{(f)}(t; \hat{\tau}_f) \right\|_2^2.$$

As a result of this minimization, a weighing factor $a_f$ and an estimate of the lifetime $\tau_f$ for the $f^{th}$ fluorophore is obtained. The parameters $\hat{a}_f$ and $\hat{\tau}_f$ denote estimates using in the minimization. The weighing parameter $a_f$ may be discarded as it is not needed in the further dye separation.

The above minimization may be solved using a least-squares fit. The fit may include a Gauss-Newton and/or a Levenberg-Marquardt algorithm. An example of the Levenberg-Marquardt is given in Marquardt, D., W.: "*An Algorithm for Least-Squares Estimation of Nonlinear param-*

*eters*", Journal of the Society for Industrial and Applied Mathematics, 11(2), 431-441, 1963.

In a next step, the dye-separated photon arrival-time data $P_i^{(f)}(\underline{x}_i, t)$ may be computed at each input image location using the aggregate dye lifetimes for the different fluorophores as computed from the aggregate input photon arrival-time data.

This step may be carried out by fitting the $f^{th}$ dye decay curves $D^{(f)}(t; \tau_f)$ containing the respective dye lifetime $\tau_f$ to the combined input photon arrival-time data $P_i(\underline{x}_i, t)$ at each or at least a plurality of the one input image locations. In other words, the step that was first performed on an aggregation of data, namely, using the input photon arrival-time data of a plurality of input image locations to determine the various dye lifetimes, is now repeated at each input image location to fit those lifetimes to the input photon arrival-time data present at this location.

A fit of the dye decay curves at an input image location to the photon arrival-time data at this input image location may be computed by solving a minimization problem of the following form:

$$b^{(f)}(\underline{x}_i) = \arg\min_{\hat{b}^{(f)}} \left\| P_i^{(f)}(\underline{x}_i, t) - \sum_{f=1}^{F} \left( \hat{b}^{(f)}(\underline{x}_i) D^{(f)}(t; \tau_f) \right) \right\|_2^2.$$

Here, $b^{(f)}(\underline{x}_i)$ is the weighing factor to be used at the location for the dye decay curve $D^{(f)}(t;\tau_f)$ of the $f^{th}$ fluorophore at the input image location $\underline{x}_i$, and $\hat{b}^{(f)}(\underline{x}_i)$ is the estimate in the minimization, or the argument of the minimization, respectively.

Again, this minimization may be solved by using a least-squares fitting algorithm, such as a Gauss-Newton or a Levenberg-Marquardt algorithm.

Another solution to the above minimization problem may be derived analytically in the following form:

$$b^{(f)}(\underline{x}_i) = \sum_{f'} A_{f'f}^{-1} \beta^{(f')}(\underline{x}_i)$$

with $$\beta^{(f')}(\underline{x}_i) = \sum_{t} P_i^{(f')}(\underline{x}_i, t) D^{(f')}(t; \tau_{f'})$$

and $$A_{f'f} = \sum_{t} D^{(f)}(t; \tau_f) D^{(f')}(t; \tau_{f'}).$$

The solution of fitting the dye decay curves $D^{(f)}(t;\tau_f)$ for each fluorophore f at each input image location $\underline{x}_i$ to the combined input photon arrival-time data $P_i(\underline{x}_i, t)$ results in a set of f dye-separated input photon arrival-time data $P_i^{(f)}(\underline{x}i, t)$ at each input image location. The set of dye-separated input photon arrival-time data is computed at a plurality of input image locations, preferably all input image locations.

$$P_i^{(f)}(\underline{x}_i, t) = \frac{b^{(f)}(\underline{x}_i)}{\sum_{f=1}^{F} b^{(f)}(\underline{x}_i)} P_i(\underline{x}_i, t).$$

Of course, the dye lifetimes do not need to be computed if predetermined dye decay curves are already available, e.g. from a library of dye decay curves and/or lifetimes of different fluorophores. In this case, it may not be necessary to compute the lifetimes of each of the different fluorophores; instead one may proceed directly to computing the weighing factor $b^{(f)}(\underline{x}_i)$, using e.g. the above minimization problem at each input image location $\underline{x}_i$, using the predetermined dye decay curves and/or lifetimes. The predetermined dye decay curves and/or lifetimes may be stored in a memory of the data processing apparatus.

If the deconvolution is carried out as described above, each of the dye-separated input images $I^{(f)}(\underline{x}_i, t)$ may be used in the deconvolution as a separate input image with the respective dye-separated input photon arrival-time data $P_i^{(f)}(\underline{x}_i, t)$ as the input photon arrival-time data.

Thus, after deconvolution, f dye-separated output images $O^{(f)}(\underline{x}_o, t)$ with output photon arrival-time data $P_o^{(f)}(\underline{x}, t)$ are obtained from the f dye-separated input images $I^{(f)}(\underline{x}_i, t)$ with input photon arrival-time data $P_i^{(f)}(\underline{x}_i, t)$.

From the dye-separated output photon arrival time data, a single output photon arrival-time data may be computed as follows:

$$P_o(\underline{x}_o, t) = \sum_{f=1}^{F} P_o^{(f)}(\underline{x}_o, t).$$

Equivalently, the dye-separated output images $O^{(f)}$ may be summed up to arrive at a single output image:

$$O(\underline{x}_o, t) = \sum_{f=1}^{F} O^{(f)}(\underline{x}_o, t).$$

The output photon arrival-time data $P_o(\underline{x}_j, t)$ then may be part of the output image data $O(\underline{x}_o, t)$ of a single output image O. This is done easily if $\underline{x}_i$ corresponds to $\underline{x}_o$ and may otherwise involve spatial interpolation if the input image locations do not correspond to the output image locations.

A fluorescence-lifetime imaging device that comprises a data processing apparatus in any of the embodiments described above and/or that is configured to carry out the data processing method in any of the embodiments described above, may comprise a light source, such as a pulsed laser. The fluorescence-lifetime imaging device may further include illumination optics for guiding the light from the light source onto a sample. The light source is configured to emit light at a fluorescence-excitation frequency of at least one fluorophore. If there is a plurality of fluorophores, i.e. more than one fluorophore, the light source is preferably configured to emit light at each fluorescence-excitation frequency of the plurality of fluorophores.

A fluorescence-lifetime imaging device may further comprise a photon counting that is configured to record input photon arrival-time data. The input photon arrival-time data may be recorded as combined input photon arrival-time data, where the photons from the different fluorophores are superposed at image location. The input photon arrival-time data may, on the other hand, be also recorded as dye-separated input photon arrival-time data.

The fluorescence-lifetime imaging device may include detection optics for guiding the emitted fluorescence onto the photon-counting device.

The detection optics may comprise fluorescence-separating filter elements to separate photons from the different fluorophores and to be able to record dye-separated input photon arrival-time data.

The fluorescence-lifetime imaging device may comprise a stage which is configured to receive a sample and to generate, on one hand, a relative movement between at least one of the light source and the photon-counting device, and on the other hand, the sample. The relative movement allows to collect the input photon arrival-time data at the different input image locations.

Preferably, the fluorescence-lifetime imaging device is a confocal laser scanning microscope which might comprise at least one pulsed light source or a super-continuum laser light source (emitting pulsed laser light) and suitable selection means for selecting at least one emission light wavelength band for exciting the at least one fluorophore in the sample, and furthermore might comprise a spectral detector device for separated spectral detection of emitted fluorescence light by at least two excited fluorophores by at least two photon-counting devices.

It is to be noted that the features described above may be applied independently to both a method and an apparatus which is configured to carry out the method, independent of whether it is described in the context of the method or in the context of the apparatus.

In the following, an embodiment is described exemplarily with reference to the drawings. According to the explanations given above, a feature which is described in this embodiment can be omitted if its technical effect is not required or is at a disadvantage in a particular application. Vice versa, a feature which is not contained in the embodiment described below but in the specification above, may be added if the particular effect of this feature is needed or is beneficial for a specific application.

In the drawings, elements that correspond to each other with respect to function and/or structure, have identical reference numerals.

First, the structure and function of a data processing apparatus 100, which may be part of a fluorescence-lifetime imaging device 128, e.g. a microscope, is described with reference to FIG. 1.

A sample 106, such as a cell or a part of a cell is illuminated by a light source 114, for example, a laser 134 or a pulsed laser 136.

The sample 106 may contain one or more fluorophores 108. The total number F of fluorophores 108 is one or larger.

The light source 114 preferably emits light in wavelengths that triggers the fluorescence of the one or more fluorophores 108.

The fluorescence-lifetime imaging device 128 may further comprise illumination optics 116 which focus the light beam 118 from the light source 114 onto the sample 106. The sample 106 and the light beam 118 or the light source 114 may be moved relative to each other, as indicated by the arrows 138. The light beam 118 or a light pulse 120 is directed onto a location $\underline{x}$ on the sample 106. At this location, fluorescence is triggered and one or more photons 132 are emitted. The photons 132 are detected by a photon-counting device 112, which may be a time-correlated counting device or an assembly comprising a gated optical intensifier and a CCD sensor or camera. The photon-counting device 112 may also be part of the fluorescence-lifetime imaging device 128. The fluorescence-lifetime imaging device 128 may further comprise detection optics 110.

The photon-counting device 112 may be rigidly coupled to the light source 114, so that it retains its relative position to the light source 114 if there is a relative movement between the light source 114 and the sample 106. This ensures that the photon-counting device 112 always points to the location where the light source 114 illuminates the sample 106.

The photon-counting device 112 generates, at each location $\underline{x}$, input photon arrival-time data $P_i$ e.g. a histogram of the photons 132 that are received in response to a single light pulse 120. From the input photon arrival-time data $P_i$, an input image I is generated. For example, the input photon arrival-time data $P_i$ at a location $\underline{x}$ are assigned to a location $\underline{x}_j$ in the input image, resulting in the input photon arrival-time data $P_i(\underline{x}_j, t)$.

After a certain time has elapsed, e.g. if no photons arrive at the photon-counting device 112 anymore or after a preset time, the sample 106 or the light beam 118 is moved to another location $\underline{x}$, where a next light pulse 120 triggers the emission of another set of photons 132. The input photon arrival-time data from this location are then assigned to another location $\underline{x}_j$ in the input image, which preferably best preserves the positional relationship between the subsequent locations $\underline{x}$ on the sample. In this way, the location $\underline{x}$ is moved along an image raster 122.

In order to obtain more reliable input photon arrival-time data $P_i(\underline{x}_j, t)$, more than one measurement may be carried out at one location $\underline{x}$, e.g. by having a sequence of light or laser pulses 120 trigger the emission of photons 132 and by overlaying the various photon counts from the different pulses of a sequence by having the time t run from the same starting point relative to a respective light pulse in the sequence.

In FIG. 1, histograms showing a photon count N over time are shown exemplarily for three different locations on the sample, corresponding to three different input image locations. These histograms correspond to the input photon arrival-time data.

By scanning the entire sample 106 along the image raster 122, an input image I is generated. The input image I contains input image data $I(\underline{x}_j, t)$ where at each location $\underline{x}_j$ of the input image I, input photon arrival-time data $P_i(\underline{x}_j, t)$ are contained. Additional information may also be encoded in the input image at each location, so the input photon arrival-time data $P_i(\underline{x}_j, t)$ may only be a subset of the input image data $I(\underline{x}_j, t)$ at every input image location $\underline{x}_j$.

The input image I is just an approximation to the ground truth $I_{GT}$, i.e. to a completely faithful rendition of the sample 106, because, for example, the detection optics 110 and the photon-counting device 112 introduce noise and artifacts.

For example, stray photons 134 that were emitted from locations different from the current location due to a finite width of the point-spread function or that were not created by fluorescence may be recorded by the photon-counting device 112.

If the sample 106 comprises more than one fluorophore 108, i.e. F is larger than 1, then two possibilities exist:

First, the photons of the different fluorophores may be combined in a single histogram, resulting in the input photon arrival-time data $P_i(\underline{x}_j, t)$, which are basically a superposition of the individual input photon arrival-time data $P_i^{(f)}(\underline{x}_j, t)$ for each individual fluorophore f, where f is a count for the different fluorophores, f=1, ..., F. The notation $P_i^{(f)}$ indicates the input photon arrival-time data of the $f^{th}$ fluorophore.

Second, each histogram at a location $\underline{x}_j$ of the input image I may contain the dye-separated input photon arrival-time data $P_i^{(f)}$ of just a single fluorophore, namely, fluorophore f, where f=1, ..., F. For this, the detection optics 110 may for example comprise one or more dye-separating filters, where each dye-separating filter is assigned to a different photon-counting device. This allows to record the input photon arrival-time data $P_i^{(f)}$ for each fluorophore by a different photon-counting device 112. In such a case, the fluorescence-lifetime imaging device 128 may comprise more than one photon-counting device 112, wherein each photon-counting device 112 is configured to record a different fluorophore. In this way, a different, dye-separated input image $I^{(f)}$ will be recorded by each of the photon-counting devices 112.

In another variant, the light source 114 may be tunable. The light source 114 may be for example configured to send out, at each location $\underline{x}$ of the sample 106, a predetermined number of subsequent light pulses 120, wherein each light pulse 120 of the series has a different and thus triggers the fluorescence of a different fluorophore 108. In this case, the input photon arrival-time data $P_i^{(f)}$ will be recorded separately and subsequently, and may also be assigned to different dye-separated input images $I^{(f)}$.

A processor 144, which may be part of the fluorescence-lifetime imaging device 128, is configured to combine the different input photon arrival-time data, $P_i(\underline{x}, t)$ or $P_i^{(f)}(\underline{x}_i, t)$, depending on the recording method as described above, into an input image $I(\underline{x}_i, t)$ or $I^{(f)}(\underline{x}_i, t)$.

The processor 144 may be a general-purpose computer which comprises, for example, a CPU and preferably a GPU and/or a vector processor.

The data processing apparatus 100 may be identical to or an entity separate of the processor 144. This can be the case if the processor 144 is part of a general-purpose computer or a specialized image-processing computer, which then may take over the functionality of the data processing apparatus 100.

The data processing apparatus 100 is configured to compute an output image O from the input image I by a deconvolution 102. The input image may be an input image, in which the arrival-time data of one or more fluorophores are combined into the input photon arrival-time data $P_i$, or a dye separated input image.

The digital output image O comprises, as the input image I, output image data $O(\overline{x}_o, t)$ at output image locations $\overline{x}_o$. Preferably, the output image O contains the same number of locations as the input image and the same dimensionality. The output image locations $\underline{x}_o$ may correspond to the input image locations $\underline{x}_i$.

Specifically, the output image data $O(\underline{x}_o, t)$ may comprise output photon arrival-time data $P_o(\underline{x}, t)$. If the input image $I^{(f)}$ is a dye-separated input image, the output image O may also comprise a plurality of dye-separated output images $O^{(f)}$ containing dye-separated output photon arrival-time data $P_o^{(f)}(\underline{x}, t)$. The data processing apparatus 100 is configured to compute the digital output image O from the digital input image I by a deconvolution 102. The deconvolution 102 may be implemented by software, i.e. computer instructions executed by the data processing apparatus 100 and/or hardware that is part of the data processing apparatus 100.

The digital output image O represents an estimate of the unblurred ground truth $I_{GT}$. More specifically, the digital output image O may comprise output photon arrival-time data $P_o(\underline{x}_o, t)$ at output image locations $\underline{x}_o$, wherein the output photon arrival-time data $P_o(\underline{x}_o, t)$ may represent an estimate $E^{(m)}(\underline{x}_i, t)$ of an unblurred ground-truth of the input photon arrival-time data.

The photon-counting device 112 might add noise and artifacts to the unblurred ground truth $I_{GT}$, which are then reflected in the input image I. The characteristics of the photon-counting device 112 and/or detection optics 110 are represented by a point-spread function $psf(\underline{x}_i[, t])$, which may be time-dependent as indicated by the brackets.

In order to reduce the blur in the input image I, the deconvolution 102 may be carried out, resulting in a sharpened or deblurred output image O. The deconvolution 102 preferably comprises an iterative algorithm 104, which updates an estimate $E^{(m)}(\underline{x}_i, t)$ of the ground truth $I_{GT}$ at each iteration m until a convergence criterion is met. For updating the estimate E, an update function U is used In particular, the data processing apparatus 100 may be configured to compute the estimate $E^{(m)}(\underline{x}_i, t)$ as follows:

$$E^{(m)}(\underline{x}_i, t) = E^{(m-1)}(\underline{x}_i, t) \cdot U(E^{(m-1)}(\underline{x}_i, t), psf(\underline{x}_i[, t]), P_i(\underline{x}_i, t)) \text{ or}$$

$$E^{(m)}(\underline{x}_i, t) = E^{(m-1)}(\underline{x}_i, t) + U(E^{(m-1)}(\underline{x}_i, t), psf(\underline{x}_i[, t]), P_i(\underline{x}_i, t)).$$

Here, the update function U depends on the current estimate $E^{(m-1)}$, the point-spread function $psf(\underline{x}^i[, t])$, and the input photon arrival-time data, $P_i$, which may be dye-separated. The update function may depend both on time and location $U = U(\underline{x}_i, t)$:

$$E^{(m)}(\underline{x}_i, t) = E^{(m-1)}(\underline{x}_i, t) \cdot U(\underline{x}_i, t) \text{ or}$$

$$E^{(m)}(\underline{x}_i, t) = E^{(m-1)}(\underline{x}_i, t) + U(\underline{x}_i, t).$$

However, as an iterative algorithm involving a time-dependent update function can lead to very complex deconvolution algorithms, which are not computationally efficient, it may be advantageous to have a time-independent update function $U(\underline{x}_i)$ in the update algorithm 104:

$$E^{(m)}(\underline{x}_i, t) = E^{(m-1)}(\underline{x}_i, t) \cdot U(\underline{x}_i) \text{ or}$$

$$E^{(m)}(\underline{x}_i, t) = E^{(m-1)}(\underline{x}_i, t) + U(\underline{x}_i).$$

As this would allow using standard deconvolution algorithms for the deconvolution 102, for example a Lucy-Richardson deconvolution.

Figure 4:
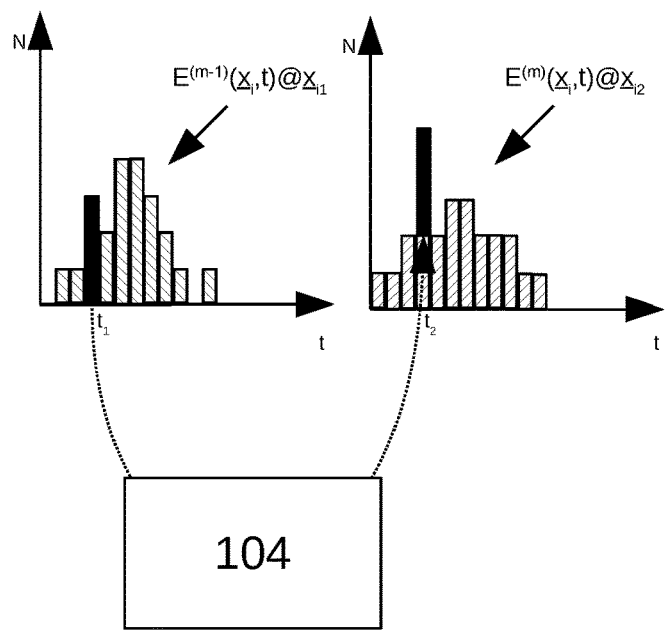
FIG. 4 shows a schematic representation of a digital output image according to some embodiments.

The effect of the time-invariant update function is shown in FIG. 4, where the input photon arrival-time data of a previous estimate $E^{(m-1)}$ at time $t_1$ at a location $\underline{x}_{i1}$ is maintained at the same time $t_1$ but shifted to another location $\underline{x}_{i2}$ in the updated estimate $E^{(m)}$. In FIG. 4, the shifted photon count is shown in black.

A time-independent update function may be obtained if an operation T is introduced which renders its argument time-independent. For example, the operation T may include a sum over time, a statistical moment, or a value of a time-dependent function a specific point in time, as described in the general part of the description. The operation T may be implemented in the data processing apparatus 100 by hardware and/or software.

Using the operation T, the iterative algorithm may assume the following form:

$$E^{(m)}(\underline{x}_i, t) = E^{(m-1)}(\underline{x}_i, t) + U(T(E^{(m-1)}(\underline{x}_i, t)), T(psf(\underline{x}_i, t)), T(P_i(\underline{x}_i, t))) \text{ or}$$

$$E^{(m)}(\underline{x}_i, t) = E^{(m-1)}(\underline{x}_i, t) \cdot U(T(E^{(m-1)}(\underline{x}_i, t)), T(psf(\underline{x}_i, t)), T(P_i(\underline{x}_i, t))).$$

Of course, the operation T does not need to be applied to the point-spread function if the point-spread function is already time-independent, i.e. psf=psf($\underline{x}_i$)

In the embodiment described exemplarily, the operation T involves a sum over time and the point-spread function is assumed to be time-invariant. Thus, the iterative algorithm 104 may have the following form:

$$E^{(m)}(\underline{x}_i, t) = E^{(m-1)}(\underline{x}_i, t) + U\left(\sum_t E^{(m-1)}(\underline{x}_i, t), psf(\underline{x}_i), \sum_t P_i(\underline{x}_i, t)\right) \text{ or}$$

$$E^{(m)}(\underline{x}_i, t) = E^{(m-1)}(\underline{x}_i, t) \cdot U\left(\sum_t E^{(m-1)}(\underline{x}_i, t), psf(\underline{x}_i), \sum_t P_i(\underline{x}_i, t)\right).$$

In such an instance, the data processing apparatus 100 may be configured to apply for example the following update function:

$$U(\underline{x}_i) = psf(-\underline{x}_i) * \frac{P_i(\underline{x}_i)}{psf(\underline{x}_i) *_{\underline{x}_i} E^{(m-1)}(\underline{x}_i)},$$

where $*_{x_i}$ denotes spatial convolution.

As an alternative to a deconvolution algorithm 102, the data processing apparatus 100 may comprise a machine learning product 130, which has been trained by input images I and output images O, wherein the output images O have been computed from the input images I using the deconvolution 102. Such a machine learning product does not carry out a deconvolution 102, but processes the input image I as the deconvolution 102 would.

In case the photon arrival-time data $P_i$ contains e.g. in superposition the fluorescence of more than one fluorophore, i.e.

$$P_i(\underline{x}_i, t) = \sum_{f=1}^{F} P_i^{(f)}(\underline{x}_i, t),$$

the deconvolution should be carried out for the dye-separated input photon arrival-time data $P_i^{(f)}$ of each fluorophore separately. In this case, the input photon arrival-time data $P_i^{(f)}$ for each fluorophore should be identified in the combined input photon arrival-time data $P_i$. This is now explained with reference to FIG. 2 for the case of two fluorophores, i.e. F=2. Of course, this number of fluorophores is only given by way of examples and the number of fluorophores may be larger. The addition of further fluorophore does not change the dye-separation process. Only F becomes larger.

Figure 2:
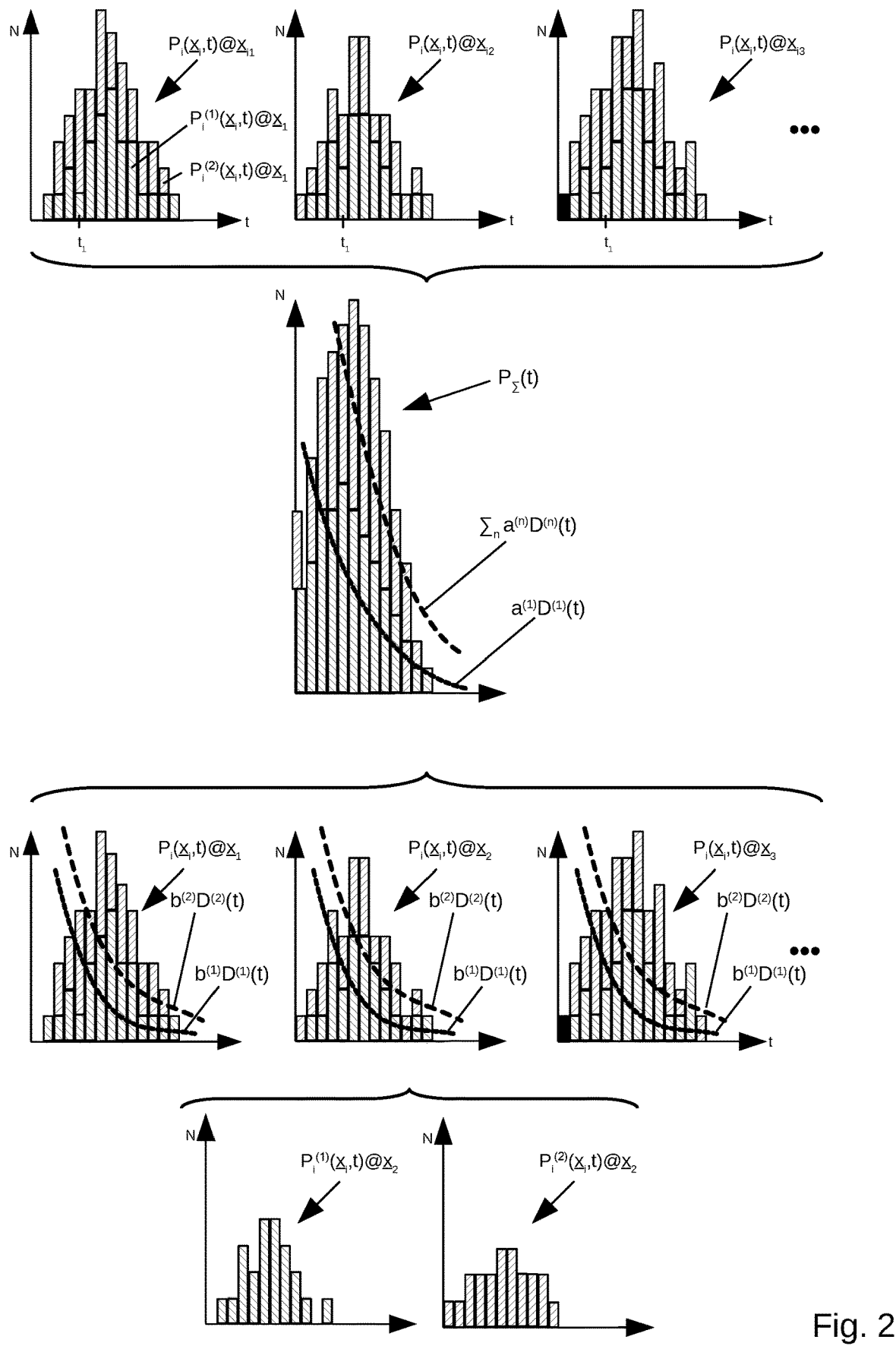
FIG. 2 shows a schematic representation of separating combined photon arrival-time data into dye-separated photon arrival-time data according to some embodiments.

In the upper part of FIG. 2, the input photon arrival-time data $P_i(\underline{x}_i, t)$ are exemplarily shown at three different input image locations $\underline{x}_{i1}, \underline{x}_{i2}, \underline{x}_{i3}, P_i(\underline{x}_{i1}, t), P_i(\underline{x}_{i2}, t), P_i(\underline{x}_{i3}, t)$. At each of these three locations, and at any given time t, the photon count N is the sum of two unknown photon counts resulting from two unknown $P_i^{(1)}(\underline{x}_i, t)$ and $P_i^{(2)}(\underline{x}_i, t)$, where $P_i^{(1)}(\underline{x}_i, t)$ denotes the input photon arrival-time data of a first fluorophore, f=1, and $P_i^{(2)}(\underline{x}_i, t)$ denotes the input photon arrival-time data of a second fluorophore, f=2.

To compute the individual dye-separated input photon arrival-time data for each fluorophore, aggregate input photon arrival-time data $P_\Sigma$ are computed from the combined input photon arrival-time data by integration or summation over a plurality of input image locations $\underline{x}_i$ for example, as follows:

$$P_\Sigma(t) = \sum_{\underline{x}_i} P_i(\underline{x}_i, t). \tag{1}$$

The aggregate input photon arrival-time data $P_\Sigma$ derived from the input photon arrival-time data are schematically shown in the center of FIG. 2.

The aggregate input photon arrival-time data may be computed from only a subset of the input image locations $\underline{x}_i$ or the entirety of the input image locations $\underline{x}_i$.

Further, it may be assumed that the input photon arrival-time data $P_i^{(f)}$ for the different fluorophores follow some known dye decay curve $D^{(f)}(t; \tau_f)$, where $\tau_f$ is a yet unknown lifetime of the fluorescence of the $f^{th}$ fluorophore.

The lifetimes $\tau_f$ can be computed for the F fluorophores e.g. by fitting the decay curves $D^{(f)}(t;\hat{\tau}_f)$ for the different fluorophores to the aggregate input photon arrival-time data $P_\Sigma$, for example using a minimization in particular a least-squares minimization as follows:

$$\{a_f, \tau_f\} = \underset{\{\hat{a}_f, \hat{\tau}_f\}}{\operatorname{argmin}} \left\| P_\Sigma(t) - \sum_{f=1}^{F} \hat{a}_f D^{(f)}(t; \hat{\tau}_f) \right\|_2^2 \tag{2}$$

As a result of this minimization, a weighing factor $a_f$ and an estimate of the lifetime $\tau_f$ for the $f^{th}$ fluorophore is obtained. The parameters $\hat{a}_f$ and $\hat{\tau}_f$ denote estimates used in the minimization. The weighing parameter $a_f$ may be discarded as it is not needed in the further dye separation.

This minimization in equation (2) may be computed by means of the Levenberg-Marquardt algorithm. As a result, the aggregate lifetimes $\tau_f$ are obtained for each of the F fluorophores, f=1, . . . , F. In other words, by combining the input photon-arrival time data of a plurality of input image locations $\underline{x}_i$, the decay curve for each fluorophore may be computed by a curve fit. Due to the combination of a plurality of input photon arrival-time data in the aggregate photon arrival-time data, the resulting aggregate photon arrival-time data will be less noisy, which then results in more accurate estimates for the decay curves.

A simple example of a dye decay curve $D^{(f)}(t;\tau_f)$, that can be used in the minimization is:

$$D^{(f)}(t; \tau_f) = h(t) *_\tau e^{-\frac{t}{\tau_f}}, \tag{3}$$

with h(t) being the response of the photon-counting device 112 for the detection of photons and $*_t$ is a convolution in time.

Of course, the step of computing the dye decay curves for each fluorophore may be omitted if pre-determined decay curves or predetermined lifetimes are used. Such predetermined decay curves may, for example, be retrieved from a storage or memory 146 (FIG. 1) of the data processing apparatus 100. Predetermined dye decay curves may be determined empirically and/or analytically.

Once the dye decay curves for all the fluorophores are known, they are used to separate the input photon arrival-time data at each input image location $\underline{x}_i$ into dye-separated input photon arrival-time data $P_i^{(f)}$. This is done by a fit or a linear combination of the dye decay curves $D^{(f)}(t;\tau_f)$ with the known lifetimes $\tau_f$ to the input photon arrival-time data $P_i$ at each image location $\underline{x}_i$.

For example, the following minimization problem may be solved to compute the dye-separated input photon arrival-time data for each fluorophore at each input image location:

$$b^{(f)}(\underline{x}_i) = \underset{\hat{b}^{(f)}}{\arg\min} \left\| P_i^{(f)}(\underline{x}_i, t) - \sum_{f=1}^{F} \left( \hat{b}^{(f)}(\underline{x}_i) D^{(f)}(t; \tau_f) \right) \right\|_2^2. \quad (4)$$

where $b^{(f)}(\underline{x}_i)$ is the weighing factor to be used at the location for the dye decay curve $D^{(f)}(t;\tau_f)$ of the $f^{th}$ fluorophore at the input image location $\underline{x}_i$, and $\hat{b}^{(f)}(\underline{x}_i)$ is the estimate in the minimization, or the argument of the minimization, respectively.

The above minimization can again be solved at each input image location using the Levenberg-Marquardt algorithm.

Another solution to the above minimization problem may be derived analytically in the following form:

$$b^{(f)}(\underline{x}_i) = \sum_{f'} A_{f'f}^{-1} \beta^{(f')}(\underline{x}_i) \text{ with}$$

$$\beta^{(f')}(\underline{x}_i) = \sum_t P_i^{(f')}(\underline{x}_i, t) D^{(f')}(t; \tau_{f'}) \text{ and}$$

$$A_{f'f} = \sum_t D^{(f)}(t; \tau_f) D^{(f')}(t; \tau_{f'}).$$

The dye-separated input photon arrival-time data $P_i^{(f)}$ may be determined using the following equation:

$$P_i^{(f)}(\underline{x}_i, t) = \frac{b^{(f)}(\underline{x}_i)}{\sum_{f=1}^{F} b^{(f)}(\underline{x}_i)} P_i(\underline{x}_i, t).$$

Once this is done, dye-separated input photon arrival-time data $P_i^{(f)}$ are available for each of the F fluorophores at each input image location $\underline{x}_i$.

Figure 3:
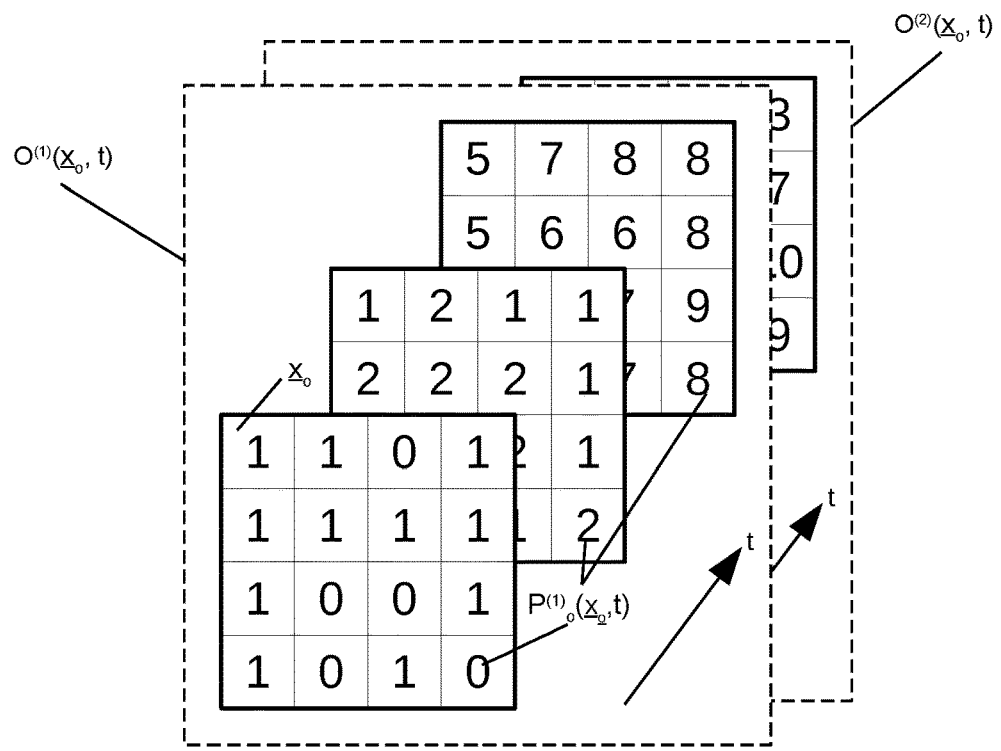
FIG. 3 shows a schematic representation of an iterative algorithm for computing a deconvolution using photon arrival-time data according to some embodiments.

Then, the deconvolution 102 is carried out as described above separately for each of the dye-separated input photon arrival-time data $P_i^{(f)}$ in lieu of the input photon arrival-time data $P_i$ or, equivalently, for each of the dye-separated input images $I^{(f)}$ in lieu of the input image I. For each of the input images $I^{(f)}$ an output image $O^{(f)}$, or, equivalently, for each dye-separated input photon arrival-time data $P_i^{(f)}$ dye-separated output photon arrival-time data $P_o^{(f)}$ are computed by the deconvolution 104 as shown in FIG. 3.

The dye-separated output photon arrival-time data $P_o^{(f)}$ images may then be summed up over the fluorophores to arrive at an output photon arrival-time data $P_o$:

$$P_o(\underline{x}_i, t) = \sum_{f=1}^{F} P_o^{(f)}(\underline{x}_i, t).$$

Equivalently, the dye-separated output images $O^{(f)}$ may be summed up to arrive at an output image:

$$O(\underline{x}_o, t) = \sum_{f=1}^{F} O^{(f)}(\underline{x}_o, t). \quad (5)$$

Figure 5:
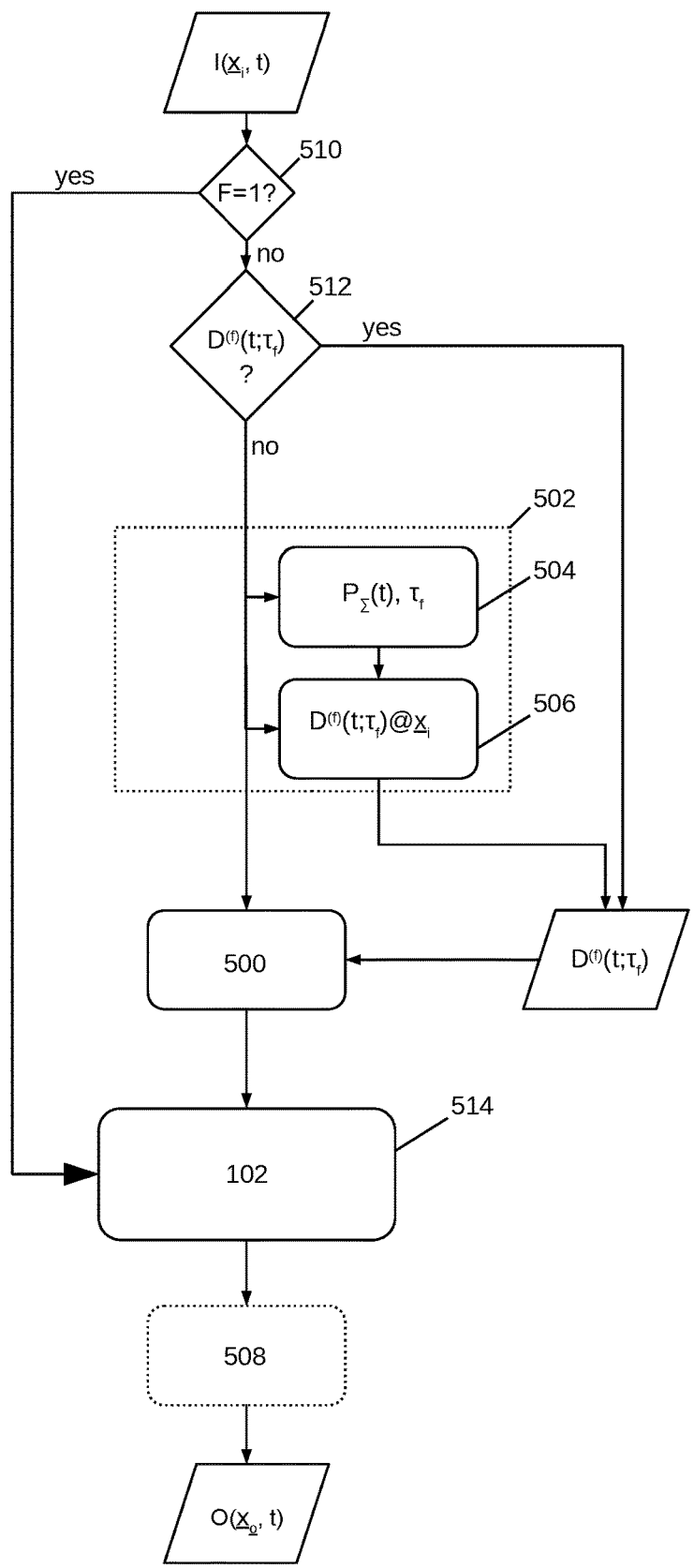
FIG. 5 shows a schematic representation of a method for deblurring a digital input image comprising photon arrival-time data according to some embodiments.

The schematic flow chart of FIG. 5 summarizes the above process as it may be carried out by the data processing apparatus 100. Starting from an input image I comprising input image data $I(\underline{x}_i)$ the input image data comprising input photon arrival-time data $P_i(\overline{x}_i, t)$ at each input image location $\underline{x}_i$, it is first decided at step 510 whether there is more than one fluorophore represented in the input photon arrival-time data $P_i$ i.e. where F is larger than 1.

If F=1, then an output image $O(\underline{x}_j, t)$ is computed using the deconvolution 102 as described above with the input photon arrival-time data If F>1, i.e. more than one fluorophore is contained in the input photon arrival-time data $P_i$, the input photon arrival-time data are split into dye-separated input photon arrival-time data $P_i^{(f)}$ and the convolution is computed for each of the dye-separated input photon arrival-time data $P_i^{(f)}$ over all input locations $\overline{x}_i$ separately.

The further process depends on whether there are already predetermined dye decay curves $D^{(f)}(t;\tau_f)$ and/or fluorescence lifetimes $\tau_f$ available for each fluorophore. This is checked in step 512.

If predetermined dye decay curves $D^{(f)}(t;\tau_f)$ or predetermined lifetimes $\tau_f$ are already available for each fluorophore, the dye-separated input photon arrival-time data $P_i^{(f)}$ can be computed using the predetermined dye decay curves, for example, by fitting them to the combined input photon arrival-time data e.g. using a linear combination of the individual predetermined dye decay curves, in step 500. This can be done using a Gauss-Newton or Levenberg-Marquardt algorithm to solve equation (4).

If no predetermined dye decay curves are available for the different fluorophores contained in the input image, these curves need to be determined step 502, Step 502 may include two steps, namely, steps 504 and 506.

In step 504, using e.g. equation (1), the aggregate input photon arrival-time data $P_\Sigma$ may be computed. Using the aggregate input photon arrival-time data $P_\Sigma$, the dye decay curves $D^{(f)}(t;\tau_f)$ or the lifetimes $\tau_f$ of the different fluorophores are computed in step 506, e.g. as per equation (2) using e.g. a dye decay function as shown in equation (3).

These decay curves may then be used in the same way as a predetermined dye decay curve would have been used in step 500 to compute the dye-separated input photon arrival-time data for each fluorophore.

Using the dye-separated input photon arrival-time data $P_i^{(f)}$ separates the original input image I into f dye-separated input images $I^{(f)}$, where each of the dye-separated input images contains the dye-separated input photon arrival-time data of only one fluorophore. At step 514, the deconvolution 102 is then carried out for each of the dye-separated input images separately, resulting in output images $O^{(f)}$. Of course, if there is only one fluorophore, there is only the input photon arrival-time data $P_i$ and only a single input and a single output image with only the output photon arrival-time data $P_o$.

If more than one fluorophore was contained in the original input image I, the output images $O^{(f)}$ may be combined into a single output image O as indicated above in step 508, e.g. using equation (5).

The output image may be displayed on any device such as a monitor, projector, or goggles. The monitor may be part of the data processing apparatus and/or of the fluorescence-lifetime imaging device.

To evaluate the deconvolution 102, random fluorescence spots with two lifetimes $\tau_1$=3.8 ns and $\tau_2$=1.3 ns were simulated. The simulated data had spatial dimensions of 256 by 256 pixels. The input photon arrival-time data contained 100 time steps, i.e. $t=t_1, \ldots, t_{100}$. The number of fluorophores was two, F=2. The maximum signal-to-noise ratio was set to 5.

Figure 6:
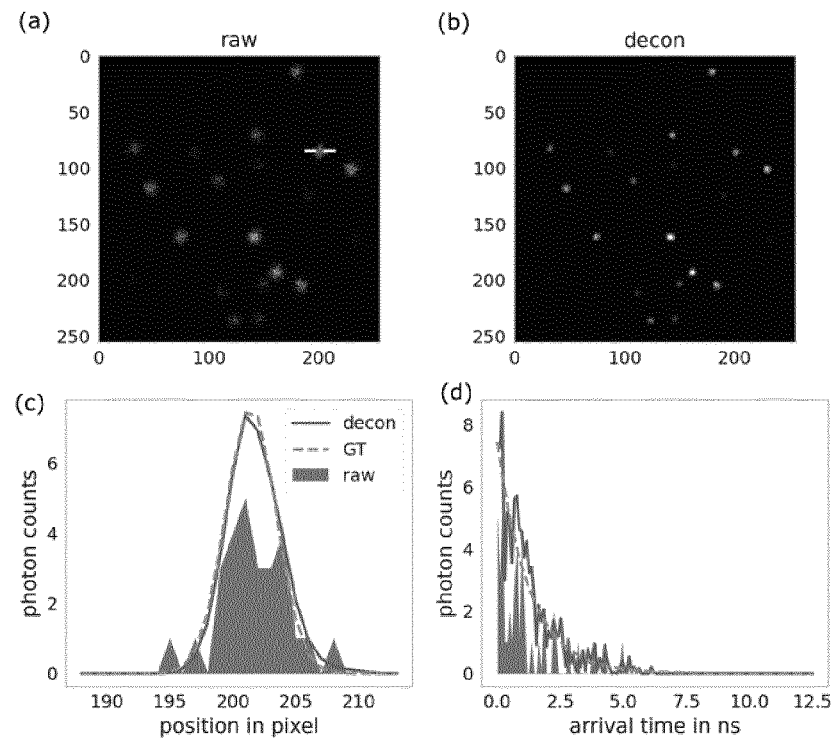
FIG. 6a shows an example of a digital input image at a specific point in time according to some embodiments.
FIG. 6b shows an example of a digital output image at the specific point of time of the digital input image in FIG. 6a, according to some embodiments.
FIG. 6c shows a schematic representation of a photon count of both the ground truth, the digital input image and the digital output image along a line of locations shown in FIG. 6a, according to some embodiments.
FIG. 6d shows a schematic representation of an arrival-time histogram in the digital input image, the digital output image and the ground truth at a location shown in FIG. 6a, according to some embodiments.

FIG. 6a shows the input photon arrival time data $P_i=\Sigma_f P_i^{(f)}$ at time $t_1=0$. FIG. 6b shows the result $P_o=\Sigma_f P_o^{(f)}$ after dye-separation and deconvolution at the same time $t_1=0$, i.e. $P_o(\underline{x}_o, t_1=0)$, where $\underline{x}_i=\underline{x}_o$. The deblurring effect is clearly visible in the output photon arrival-time data.

The deblurring effect is also seen in the intensity cross section of FIG. 6c, which is taken along input image locations on the white line in FIG. 6a.

In FIG. 6c, the input photon arrival-time data along this line are indicated as "raw", the intensity distribution of the ground truth, i.e. the fluorescence spots without the noise is indicated as "GT" and the output photon arrival-time data are indicated as "decon". The result of the deconvolution process comes very close to the ground truth and represents a huge improvement over the "raw", i.e. noisy input image data.

FIG. 6d shows, at one fluorescence spot indicated by the star on the line in FIG. 6a, the input photon arrival-times, "raw", both of the raw data, the ground truth and the deconvolution. Again, the result of the above deconvolution is very close to the ground truth and represents a huge improvement over the raw data. In FIGS. 6c and 6d, the data from the output image are taken at output image locations $\underline{x}_o$, which correspond to the input image locations $\underline{x}_i$, i.e. along the same line and from the same fluorescence spot.

Clearly, the deconvolution leads to an enhancement of the resolution and a significant decrease of the signal-to-noise ratio. The peak signal-to-noise ratio improved significantly from 36 in the raw input image data to 44 in the deconvolved output image data.

Figure 7:
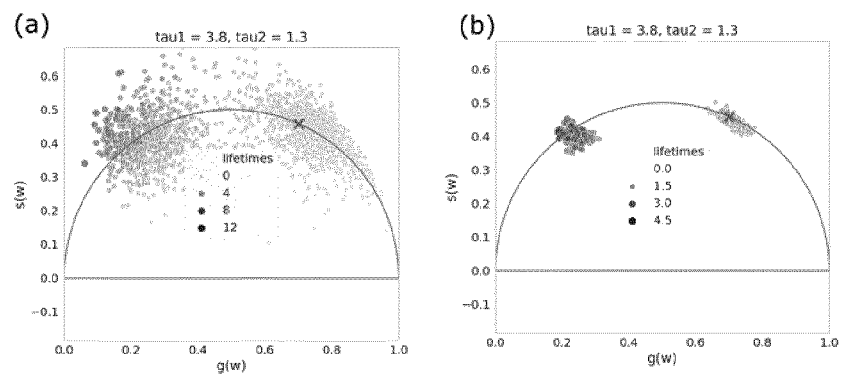
FIG. 7a shows a schematic representation of a phasor plot of photon arrival-time data in the digital input image of FIG. 6a, according to some embodiments.
FIG. 7b shows a schematic representation of a phasor plot of the photon arrival-time data in the output image of FIG. 6b, according to some embodiments.

The same quality improvement can be seen in the phasor plots that are shown in FIG. 7a for the input image data and in FIG. 7b for the output image data using the same data as for FIG. 6a-d. The phasor plot in FIG. 7a of the input image data exhibits large variations due to noise. After dye-separation deconvolution, every point in the phasor space can be assigned to a fluorophore.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microscope comprising a system as described in connection with one or more of the FIGS. 1 to 7. Alternatively, a microscope may be part of or connected to a system as described in connection with one or more of the FIGS. 1 to 7.

Figure 8:
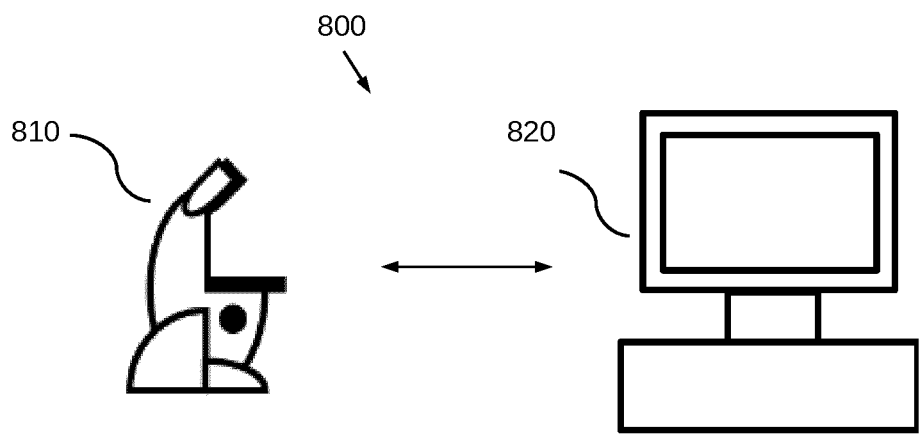
FIG. 8 another schematic representation of a data processing apparatus and a fluorescence-lifetime imaging device, according to some embodiments.

FIG. 8 shows a schematic illustration of a system 800 configured to perform a method described herein. The system 800 comprises a microscope 810 and a computer system 820. The microscope 810 is configured to take images and is connected to the computer system 820. The computer system 820 is configured to execute at least a part of a method described herein. The computer system 820 may be configured to execute a machine learning algorithm. The computer system 820 and microscope 810 may be separate entities but can also be integrated together in one common housing. The computer system 820 may be part of a central processing system of the microscope 810 and/or the computer system 820 may be part of a subcomponent of the microscope 810, such as a sensor, an actor, a camera or an illumination unit, etc. of the microscope 810.

The computer system 820 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system X20 may comprise any circuit or combination of circuits. In one embodiment, the computer system X20 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 820 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 820 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 820 may also include a display device, one or more speakers, and a keyboard and/or controller, which can include a mouse, trackball, touch screen, voice-recognition device, or any other device that permits a system user to input information into and receive information from the computer system 820.

Some or all of the method steps may be executed by (or using) a hardware apparatus, like for example, a processor, a microprocessor, a programmable computer or an electronic circuit. In some embodiments, some one or more of the method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a preprocessing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or of edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 100 data processing apparatus
102 deconvolution
104 iterative algorithm
106 sample
108 fluorophore
110 detection optics
112 photon-counting device
114 light source
116 illumination optics
118 light beam
120 light pulse
122 image raster
128 fluorescence lifetime imaging device
130 machine learning product
132 photon
134 laser
136 pulsed laser 138 relative movement between sample and photon counting device
140 stray photon
142 pulse period
144 processor
146 storage/memory
500 computation of dye-separated input photon arrival-time data
502 computation of the dye decay curves of different fluorophores
504 computation of the fluorescence lifetimes of the different fluorophores
506 computation of the dye decay curves at the input image locations
508 combining the dye-separated output images for each fluorophore
510 determining the number of fluorophores in the input photon arrival-time data
512 determining whether predetermined dye decay curves and/or fluorescence lifetimes are available
514 carrying out the deconvolution
$a^{(f)}$, $b^{(f)}$ weighing factors for adapting the dye decay curve of fluorophore f
$\hat{a}^{(f)}$, $\hat{b}^{(f)}$ weighing factors used in minimization
$D^{(f)}(\underline{x}_j, t)$ dye decay curve of fluorophore f at location $\underline{x}_j$
E, $E^{(m)}(\underline{x}_j, t)$ estimate of ground truth at iteration m
f fluorophore count
F number of fluorophores
I digital input image
$I(\underline{x}_j, t)$ input image data
$I_{GT}(\underline{x}_j, t)$ unblurred ground truth
t time
N photon count
m iteration count
M maximum iteration
O digital output image
$O(\underline{x}_j, t)$ output image data
$P_i$, $P_i(\underline{x}_j, t)$ input photon arrival-time data
$P_\Sigma$, $P_\Sigma(\underline{x}_j, t)$ aggregate input photon arrival-time data
$P_i^{(f)}$, $P_i^{(f)}(\underline{x}_j, t)$ dye-separated input photon arrival-time data for $f^{th}$ fluorophore
$P_o$, $P_o(\underline{x}_o, t)$ output photon arrival-time data
$P_o^{(f)}$, $P_o^{(f)}(\underline{x}_o, t)$ output photon arrival time data for $f^{th}$ fluorophore
$psf(\underline{x}_j[, t])$ point-spread function
T operation for rendering argument time-independent
U Update function
$\underline{x}$ location at sample
$\underline{x}_j$ input image location
$\underline{x}_o$ output image location

The invention claimed is:

1. A data processing apparatus for processing a digital input image, the data processing apparatus being configured to:
receive the digital input image, the digital input image comprising input photon arrival-time data at input image locations,
compute a digital output image based on the digital input image by deconvolution, the digital output image comprising output photon arrival-time data at output image locations, the output photon arrival-time data representing an estimate of an unblurred ground-truth of the input photon arrival-time data, and
compute the deconvolution by an iterative algorithm using an update function, the update function depending on a point-spread function, a previous estimate of the ground-truth and the input photon arrival-time data.

2. The data processing apparatus according to claim 1, wherein at least one of the point-spread function and the update function is time-independent.

3. The data processing apparatus according to claim 1, wherein the deconvolution comprises an operation on at least one of the input photon arrival-time data, the point-spread function and the previous estimate as a respective operand, the operation being configured to eliminate time-dependency of the respective operand.

4. The data processing apparatus according to claim 3, wherein the operation includes at least one of a sum over time of the respective operand, or a value of the respective operand at an input image location and a specific point in time.

5. The data processing apparatus according to claim 1, wherein the iterative algorithm comprises a combination of the update function with the estimate of the ground-truth, the combination being at least one of additive or multiplicative.

6. The data processing apparatus according to claim 1, wherein the input photon arrival-time data relate to a number of different fluorophores, the number being greater than one, and wherein the data processing apparatus is further configured to:
compute a number of dye-separated input photon arrival-time data, the number of dye-separated input photon arrival-time corresponding to the number of different fluorophores, and
compute the deconvolution separately for each of the number of dye-separated input photon arrival-time data as the input photon arrival-time data.

7. The data processing apparatus according to claim 6, being further configured to:
compute aggregated input photon arrival-time data from a combination of the input photon arrival-time data at a plurality of input image locations, and
compute a dye decay curve for each of the number of fluorophores from a fit of a combination of predetermined decay curves to the aggregated input photo arrival-time data.

8. The data processing apparatus according to claim 7, wherein the computation of the dye decay curve for each respective fluorophore of the number of fluorophores comprises computing a lifetime of the respective fluorophore.

9. The data processing apparatus according to claim 7, wherein the computation of the number of dye-separated input photon arrival-time data at a respective input image location is performed by one of a fit of the dye decay curves, or a linear combination of the predetermined dye decay curves to the input photon arrival-time data at the respective input image location.

10. A fluorescence-lifetime imaging device comprising a data processing apparatus according to claim 1.

11. A computer-implemented method for processing a digital input image, the digital input image comprising input photon arrival-time data at input image locations, the method comprising:
computing a digital output image from the digital input image by deconvolution, the digital output image comprising output photon arrival-time data at output image locations, the output photon arrival-time data representing an estimate of an unblurred ground-truth of the input photon arrival-time data, and
computing the deconvolution by an iterative algorithm using an update function, the update function depending on a point-spread function, a previous estimate of the ground-truth and the input photon arrival-time data.

12. A machine learning product for processing a digital input image, the digital input image comprising input photon arrival-time data at input image locations, the machine learning product being configured to:
- compute a digital output image, the digital output image comprising output photon arrival-time data at output image locations, the output photon arrival-time data representing an estimate of an unblurred ground-truth of the input photon arrival-time data,
- wherein the machine learning product has been trained by pairs of different training digital input images and training digital output images, wherein a respective training digital output image of a respective pair is computed from a respective training digital input image of the respective pair using the method according to claim 11.

13. A method of training a machine learning product by pairs of different training digital input images and training digital output images, wherein a respective training digital output image of a respective pair is computed from a respective training digital input image of the pair using the method according to claim 11.

14. A non-transitory computer-readable medium having program steps stored thereon, the program steps, when executed by a computer processor, causing performance of a method for processing a digital input image, the digital input image comprising input photon arrival-time data at input image locations, the method comprising:
- computing a digital output image from the digital input image by deconvolution, the digital output image comprising output photon arrival-time data at output image locations, the output photon arrival-time data representing an estimate of an unblurred ground-truth of the input photon arrival-time data, and
- computing the deconvolution by an iterative algorithm using an update function, the update function depending on a point-spread function, a previous estimate of the ground-truth and the input photon arrival-time data.

* * * * *